Dec. 4, 1934.  F. JUDGE  1,982,737
APPARATUS FOR REMOVING METAL IN A THREADING OPERATION
Filed June 23, 1933   3 Sheets-Sheet 1
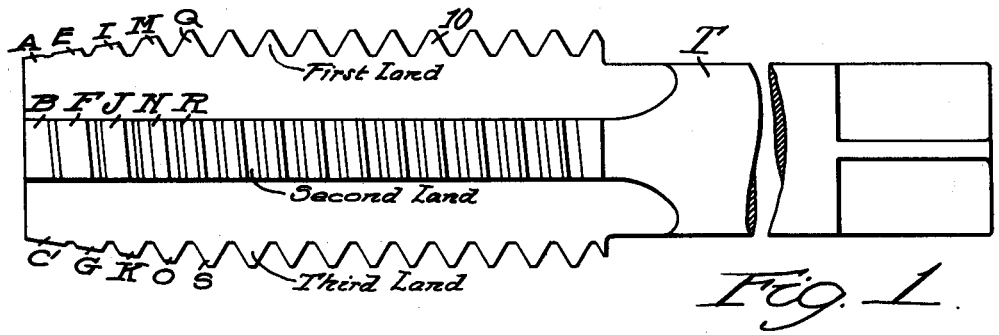
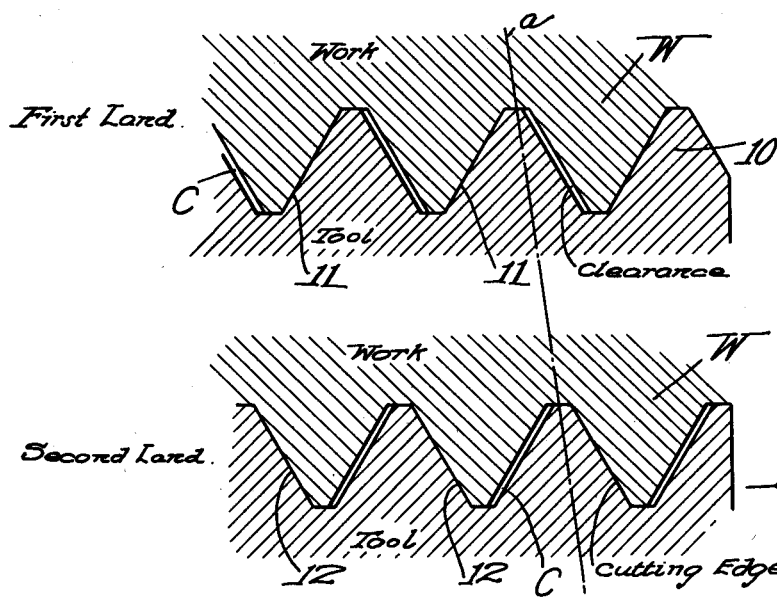
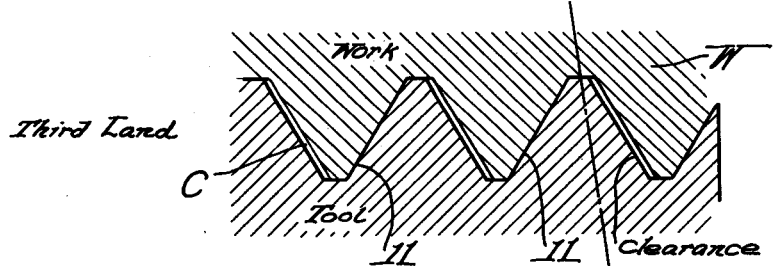
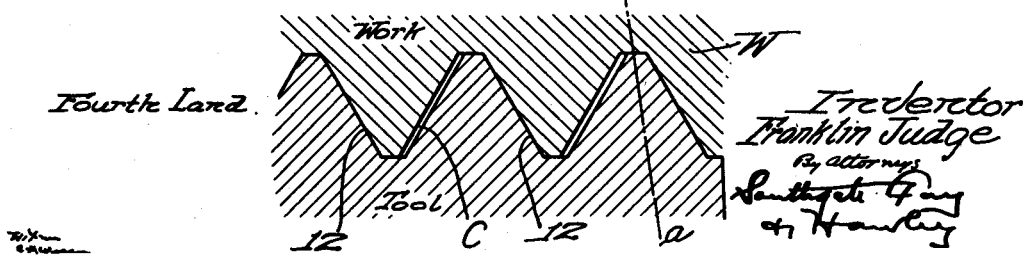
Fig. 1.
Fig. 2.
Inventor
Franklin Judge

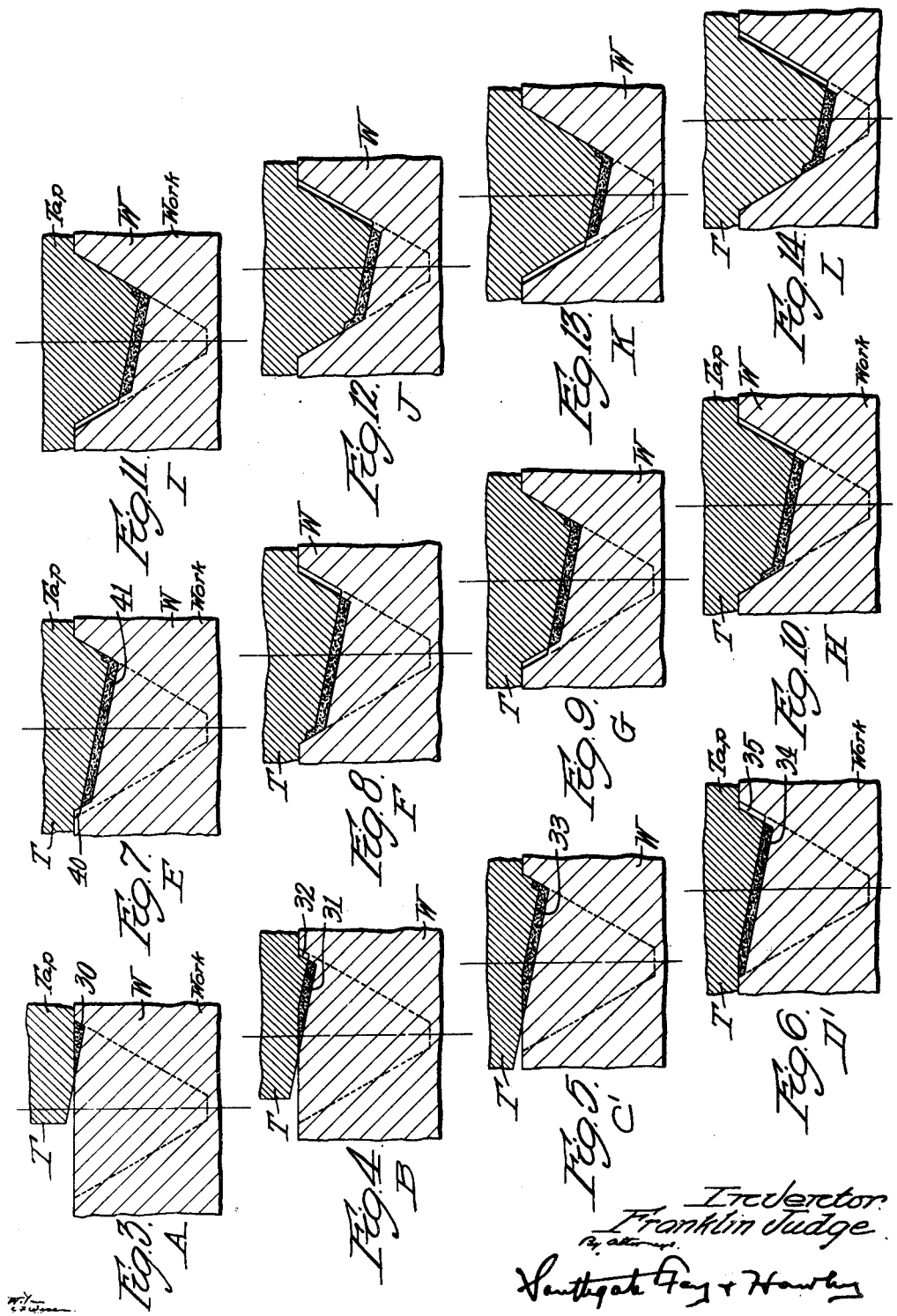

Dec. 4, 1934. F. JUDGE 1,982,737
APPARATUS FOR REMOVING METAL IN A THREADING OPERATION
Filed June 23, 1933   3 Sheets-Sheet 3
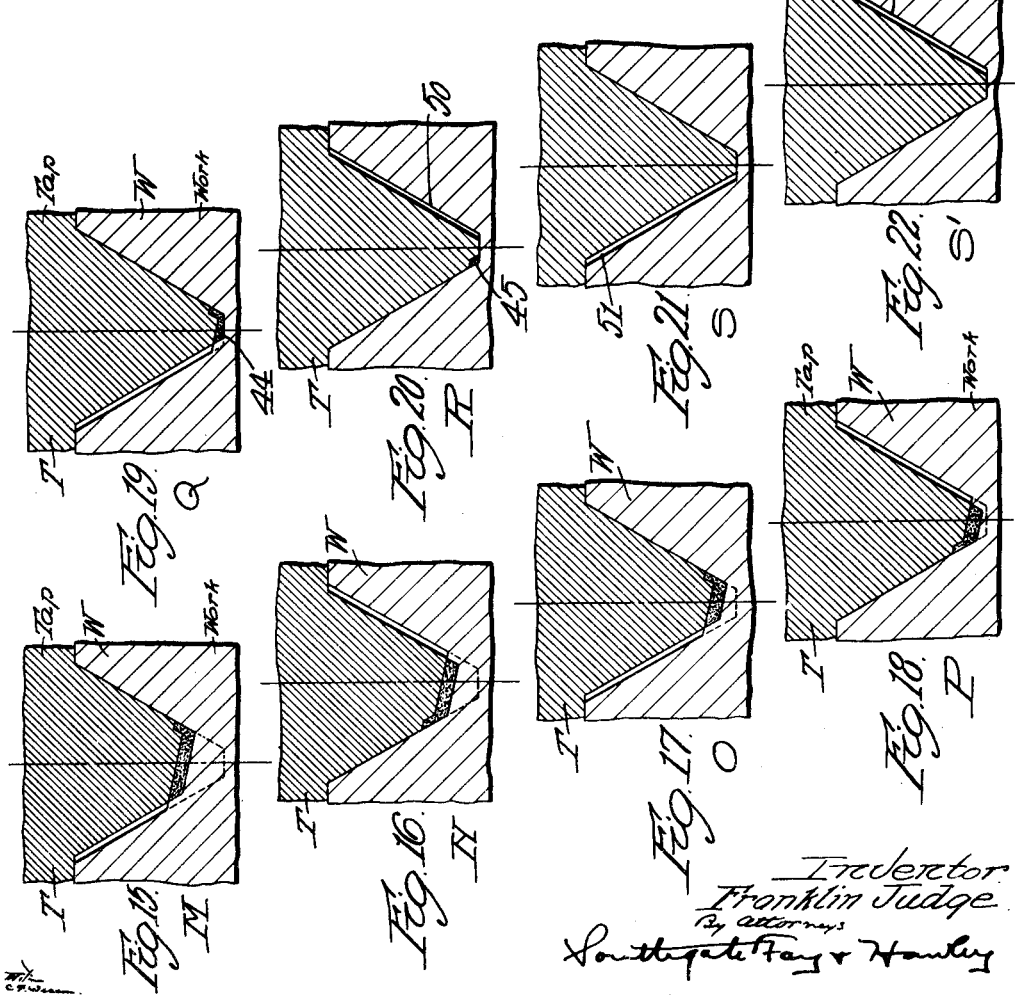

Patented Dec. 4, 1934

1,982,737

UNITED STATES PATENT OFFICE

1,982,737

APPARATUS FOR REMOVING METAL IN A THREADING OPERATION

Franklin Judge, Greenfield, Mass., assignor to Greenfield Tap & Die Corporation, Greenfield, Mass., a corporation of Massachusetts Application June 23, 1933, Serial No. 677,291

4 Claims. (Cl. 10—141)

This application is a continuation in part of my prior application, Serial No. 555,951, filed by me August 8, 1931 on a Tap for cutting tough metals.

This invention relates to a novel and improved apparatus for removing metal by a thread-cutting operation in which either the threading tool or the work is rotated within a co-axial opening in the other element. In some cases a tap is relatively rotated in a co-axial opening in the work, and in other cases the work is relatively rotated in a co-axial opening in a die.

While capable of general application, this invention relates particularly to an apparatus well adapted for use in thread-cutting operations on soft but tough and stringy metals, such as certain steels widely used in automobile construction.

In threading such materials, portions of the stringy metal are found to become so firmly attached to the sides of the cutting teeth or so firmly wedged in the grooves between the teeth that the tool frequently becomes clogged or loaded, rendering the tool useless for its intended purposes and causing breakage thereof.

It is the general object of my invention to provide an improved apparatus for removing metal in either external or internal threading operations, by the use of which apparatus this clogging or loading of the threading tool or wedging of metal in the grooves thereof is effectually avoided. To accomplish this result, successive cutting actions are concentrated, first on one side of the threads and then on the other, alternately back and forth, while clearances are similarly provided opposite each cut, and this alternate cutting and clearing is progressively carried on throughout the threading operation and to the full depth of the threads.

In the preferred form of cutting tool, such as a tap or die, the teeth are arranged in axially extending lands, and all of the teeth on any one land are offset axially or provided with clearance on the same side of each tooth, while the teeth on the next following land are offset in the opposite direction or provided with clearance on the opposite side of each tooth. In this way the teeth of one land cut on one side and the teeth of the next successive land cut on the other side, and clearances are left on the sides not used in cutting.

My invention further relates to arrangements and combinations of parts which will be hereinafter described and more particularly pointed out in the appended claims.

A preferred form of the invention is shown in the drawings, in which

Fig. 1 is a side elevation of a tap embodying my improvements;

Fig. 2 is a diagrammatic view showing the relation of the teeth and work for successive lands of a threading tool and also showing the action of the tool in removing stock from said successive land;

Figs. 3 to 22 inclusive are sectional views illustrating successive steps in the cutting of a screw-thread by my improved apparatus, and Fig. 23 is a plan view of a die embodying my improvements.

With the usual forms of taps and dies, the method of cutting is to have the cutting teeth engage the metal of the threads being cut on both sides thereof at the same time, so that the metal of each thread is in tightly wedged engagement with the cutting teeth at both sides thereof. This metal, if tough and stringy, has a tendency to become tightly wedged in the grooves or recesses of the cutting tool and to build up therein in an obstructive manner, interfering with the proper cutting action and causing high resistance, even to the point of breakage.

In using the novel device of my present invention, each cutting operation is concentrated along only a portion of the periphery between the cutting teeth and the sides of the threads, the remainder of this periphery being left clear to permit escape of the removed metal and entrance of lubricant, and at the same time avoiding pressures against opposite sides of the cutting teeth and the accumulation of particles of removed material between the tool and the work.

This clearing action of the invention is well illustrated in Fig. 2, showing the operation of the teeth on four successive lands of a threading tool, first cutting on one side of the teeth 10 of one land and then on the opposite side of the teeth 10 on another land in alternation. Clearances C are provided alternately, first at one side and then at the other of successive cutting teeth 10, and the successive teeth 10 cooperate to form a standard V thread in the work W. It will also be understood that the invention may be utilized to advantage in connection with the production of other types of threads, such as square or Acme.

As shown in Fig. 2, clearance C is provided at the right side of each tooth in the first land of the tool, and an associated cutting edge 11 is provided at the left side of each tooth.

In the second land, the clearance and cutting edges are reversed, bringing a clearance C at the left side of each tooth and a cutting edge 12 at the right side of each tooth. The arrangement in the third and fourth lands corresponds to the arrangement in the first and second lands respectively.

By reference to the helix line $a$ in Fig. 2, it will be evident that as the teeth follow each other in cutting a thread groove, the clearance C in effect shifts alternately from right to left or from left to right as each succeeding tooth enters the thread groove in the work. Consequently, for every cutting tooth there is provided a clearance C at one side thereof and a cutting edge 11 or 12 at the other side, and cutting operations are performed by successive teeth first on one side of the thread groove and then on the other side.

Also it will appear that for each cutting tooth the clearance space C provides for effective circulation of lubricant between the tooth and the work, and also provides a certain amount of space for fine severed particles of metal produced by the action of the last previously operating cutting edge.

In the preferred arrangement, the clearance C is on the same side of all of the teeth in any one land, and the clearance C is at the opposite side of all of the teeth in the next succeeding land.

Such an arrangement contemplates the provision of a tap or die having an even number of lands, but the advantages of my invention may to a large extent be utilized in a tap or die having an uneven number of lands, in which case there will be one more land with clearance at one side than with clearance at the other side, and at one point on the periphery of the tap or die two lands having clearance at the same side will follow in succession.

I also find it desirable to make the clearance C substantially uniform in width from the root to the point of the tooth, as clearly shown in Fig. 2. This width of clearance may be varied to suit different conditions of operation but in the usual construction the clearance is only a very few thousandths of an inch.

One method of providing tooth clearance as above described is set forth in my copending application, Serial No. 578,038 filed November 30, 1931, but for the purposes of the present application it is sufficient to state that the clearance may be provided during the original formation of the teeth, whether the teeth are produced by a cutting or a grinding operation, or that the clearance may be provided by a supplementary grinding or relieving operation after teeth of the usual form, width and location have been first produced.

Referring to Fig. 1, my invention is there illustrated in connection with a tap T having cutting teeth 10 arranged in four lands, each extending lengthwise of the tap and substantially parallel to the axis thereof. The tap T is shown as provided with a tapered entrance portion and with a squared shank portion to which a wrench may be applied, but these features are relatively non-essential.

Similarly, in Fig. 23 the invention is illustrated in connection with a die D provided with cutting teeth arranged in four substantially parallel lands.

Having described the construction of my improved threading tool, I will now describe the manner in which metal is removed in the formation of either an internal or an external thread.

My improved threading tool cuts at one side only of a thread groove in the work with each tooth at each land, and always provides clearance at the other side of the thread groove at the cutting point. As there is thus clearance at one side or the other of the thread groove at every cutting point, the wedging of portions of metal in a groove of the threading tool is effectually avoided. Also, with a threading tool constructed as above described, the clearance of each tooth directly follows a cutting edge of the next preceding tooth and allows space for particles of severed metal which might otherwise adhere to the sides of the thread groove or to the cutting teeth.

All of the cutting edges and clearance sides are preferably similarly disposed in any one land, so that the cutting edge of one tooth is always adjacent the clearance side of the tooth located next adjacent thereto axially in the same land. Furthermore, all of the cutting teeth have their cutting and clearance sides reversely disposed in successive lands, and all of the teeth of the tap or die except the entrance teeth are identical in cross section and in axial spacing from each other. Since the clearance is carried fully up to the apex of the cutting tooth, one side of the apex is correspondingly cut away on one side so that as shown in Figs. 21 and 22 the center of the apex is offset to one side or the other of the center line of the groove in the work.

Operating in this manner, the previous difficulty encountered in tapping holes in soft stringy metal is largely avoided, and a threading tool will continue to operate satisfactorily in such metal even after becoming slightly dull. On the contrary, when a slightly dull standard tap or die is used in such metal, severed portions of the metal and even portions of the partially formed thread in the work frequently become so firmly attached to the teeth or so tightly crowded or wedged into the grooves of the threading tool that a portion of the thread will be torn away and freeze in the groove of the tool, whereupon either the tool will break or the thread in the work will be destroyed.

The manner in which a tap is cut and the stock is removed in a threading operation performed with my improved tap or die is clearly shown in the series of sectional views, Figs. 3 to 22 inclusive.

For purposes of illustration, it may be assumed that the threading operation is being performed by the tap T, although the stock would be removed in the same manner if the operation were being performed by the die D.

It should be understood that the darkly shaded area for each tap tooth is assumed to indicate that part of the tooth which is actually performing a cutting operation on the work. Or, looked at in a different way, the darkly shaded area corresponds in extent and location to the portion of stock being removed by a particular cutting tooth. It will also be understood that this shaded area is greatly exaggerated for the sake of clearness, and that the actual thickness of stock removed by any one tooth is commonly measured in thousandths of an inch.

Referring to Fig. 3, the first beveled or tapered tooth marked A in the first land of the tap T shown in Fig. 1 is removing an initial portion or chip 30 from the side wall of a hole to be tapped in the work W.

In Fig. 4, the tooth B in the second and next succeeding land of the tap is removing a portion of stock 31. It will be noted that the tooth B is provided with clearance at its right-hand edge, which clearance is indicated by the small unshaded opening 32.

In Fig. 5 a chip 33 of stock is being removed by the third tooth C' in the third land, while in Fig. 6 a chip 34 is being removed by the tooth D' in the fourth land, the clearance 33 being of increased depth. This tooth D' is the first tooth which extends the full width of the tooth to the left, so that in Fig. 7 a small clearance 40 appears at the left while the fifth tooth E on the first land is removing the chip 41.

The operation of the cutting teeth as the teeth increase progressively in height is clearly shown in the succeeding figures, each of the figures being lettered to correspond to the letters appearing on the teeth of the tap as shown in Fig. 1.

In Figs. 19 and 20 the teeth Q and R are of full diameter and are shown removing the final chips or stock portions 44 and 45 respectively. In Fig. 20, a clearance 50 of the full depth of the thread groove appears at the right of the cutting tooth R.

Thereafter the full sized teeth S and S' advance successively into the thread groove, as indicated in Figs. 21 and 22, these teeth operating to clear the groove and to insure full size thereof, should the entering teeth become worn or slightly dulled. A full depth clearance 51 appears at the left of each tooth S and a full depth clearance 50 at the right of each tooth S'.

With this description it is clear that for each cutting tooth there is provided a cutting edge at one side and clearance space at the other side and that the clearance shifts from one side to the other for each successive tooth which enters the work.

Reference to Fig. 2 will also show that the cutting edges and clearance spaces are so arranged that no thread in the work is ever positioned between two cutting edges operating simultaneously thereon. The possibility of a portion of a thread in the work being wedged in the groove of the tap or die is thus effectually avoided.

In actual operation, it has been found that my improved taps and dies will perform thousands of threading operations in soft stringy steel, whereas the performance of standard taps or dies under similar conditions is limited to hundreds.

Having thus described my invention and the advantages thereof, I do not wish to be limited to the details herein disclosed, otherwise than as set forth in the claims, but what I claim is:—

1. A tool for cutting screw threads concentric with the axis of the tool, comprising a cutting head having integral therewith a plurality of partial and full cutting teeth extending along helical lines around said axis and disposed in lands formed substantially parallel to the axis of said tool, the partial cutting teeth being successively higher so as to cut successive increments along the center line of the cut groove, each tooth having a cutting side and a clearance side at the same inclination to the axis of the tool and all of the cutting teeth on one land providing such clearance at one and the same side of each cutting tooth on said land that each of said teeth clears on said side to the depth of the cut made by the preceding tooth of the previous land whereby all of the teeth in said first mentioned land have cutting side edges similarly disposed and whereby each cutting tooth has a cutting side edge positioned adjacent to the clearance side of the next adjacent tooth of the same land, and all of the cutting teeth on a succeeding land providing such clearance at the opposite side of each cutting tooth that each of said teeth clear on said side to the depth of the cut made by the preceding tooth of the previous land, thereby providing cutting side edges all adjacent to clearance sides but with said cutting side edges and clearance sides reversely disposed with respect to the cutting teeth of said first mentioned land.

2. A tool for cutting screw threads concentric with the axis of the tool, having a plurality of partial and full cutting teeth disposed in lands extending substantially parallel to the axis of the tool, the partial cutting teeth being successively higher so as to cut successive increments along the center line of the cut groove, each full tooth having one cutting side edge only and one clearance side, and all of the cutting teeth on one land providing clearance at one and the same side of each cutting tooth on said land and including such clearance at the apex of each tooth that the center of the apex is offset with relation to the center of the groove being cut, whereby all of the teeth in said land have cutting side edges similarly disposed and whereby each cutting tooth has a cutting side edge positioned adjacent the clearance side of the next adjacent tooth of the same land, and all of the cutting teeth on a succeeding land providing clearance at the opposite side of each cutting tooth and including clearance at the apex of each tooth, thereby providing cutting side edges all adjacent to clearance sides but with said cutting side edges and clearance sides reversely disposed with respect to the cutting teeth of said first land.

3. A tool for cutting flat apex standard screw threads concentric with the axis of the tool, having a plurality of partial and full cutting teeth disposed in an even number of lands extending substantially parallel to the axis of the tool, the partial cutting teeth being successively higher so as to cut successive increments along the center line of the cut groove, all of the full cutting teeth having a flat end cutting edge and one cutting side edge only and one clearance side and all of the full cutting teeth being identical in axial spacing and in radial cross section as viewed in the same direction, all of the cutting teeth on one set of alternate lands providing clearance at one and the same side of each cutting tooth on said set of lands and including such clearance at the apex of each tooth that the center of the apex is offset with relation to the center of the groove being cut, and all of the cutting teeth on the other set of alternate lands providing clearance at the opposite side of each cutting tooth of said other set of lands and including clearance at the apex of each tooth, whereby the cutting side edge of each cutting tooth in each land is positioned adjacent the clearance side of the next adjacent tooth of the same land, and whereby the cutting side edges and the clearance sides of said cutting teeth are reversely disposed in successive lands.

4. A tool for cutting flat apex standard screw threads concentric with the axis of the tool, having a plurality of partial and full cutting teeth disposed in an even number of lands extending substantially parallel to the axis of the tool, the partial cutting teeth being successively higher so as to cut successive increments along the center line of the cut groove, all of the full cutting teeth having a flat end cutting edge and one cutting side edge only and one clearance side and all of the full cutting teeth being identical in axial spacing and in radial cross section as viewed in the same direction, all of the cutting teeth on one set of alternate lands providing clearance at one and the same side of each cutting tooth on said set of lands and including such clearance at the apex of each tooth that the center of the apex is offset with relation to the center of the groove being cut, and all of the cutting teeth on the other set of alternate lands providing clearance at the opposite side of each cutting tooth of said other set of lands and including clearance at the apex of each tooth, whereby the cutting side edge of each cutting tooth in each land is positioned adjacent the clearance side of the next adjacent tooth of the same land, and whereby the cutting side edges and the clearance sides of said cutting teeth are reversely disposed in successive lands, the clearance of all of said teeth being substantially uniform from the root to the apex of each tooth.

FRANKLIN JUDGE.